United States Patent
Kasperovics et al.

(10) Patent No.: US 10,114,859 B2
(45) Date of Patent: Oct. 30, 2018

(54) EXTENSIONS OF STRUCTURED QUERY LANGUAGE FOR DATABASE-NATIVE SUPPORT OF GRAPH DATA

(71) Applicant: SAP SE, Walldorf (DE)

(72) Inventors: Romans Kasperovics, Mannheim (DE); Tobias Mindnich, Sulzbach (DE); Cornelia Kinder, Walldorf (DE); Christoph Weyerhaeuser, Heidelberg (DE); Thomas Fischer, Walldorf (DE)

(73) Assignee: SAP SE, Walldorf (DE)

(*) Notice: Subject to any disclaimer, the term of this patent is extended or adjusted under 35 U.S.C. 154(b) by 365 days.

(21) Appl. No.: 14/946,664

(22) Filed: Nov. 19, 2015

(65) Prior Publication Data

US 2017/0147705 A1 May 25, 2017

(51) Int. Cl.
*G06F 17/30* (2006.01)

(52) U.S. Cl.
CPC ............... *G06F 17/30404* (2013.01)

(58) Field of Classification Search
USPC ........................................................ 707/737
See application file for complete search history.

(56) References Cited

U.S. PATENT DOCUMENTS

| | | | | |
|---|---|---|---|---|
| 5,832,485 A | * | 11/1998 | Chaudhry | G06F 17/30451 |
| 9,576,020 B1 | * | 2/2017 | Patterson | G06F 17/30398 |
| 9,697,254 B2 | * | 7/2017 | Paradies | G06F 17/30513 |
| 9,734,607 B2 | * | 8/2017 | Macko | G06T 11/206 |
| 2002/0087275 A1 | * | 7/2002 | Kim | G06F 19/26 702/19 |
| 2012/0084422 A1 | * | 4/2012 | Bandi | H04L 41/5045 709/223 |
| 2014/0172810 A1 | * | 6/2014 | Paradies | G06F 17/30315 707/705 |
| 2015/0026158 A1 | * | 1/2015 | Jin | G06F 17/30958 707/722 |
| 2015/0370838 A1 | * | 12/2015 | Paradies | G06F 17/30958 707/738 |
| 2015/0370919 A1 | * | 12/2015 | Bornhoevd | G06F 17/30958 707/798 |
| 2016/0063037 A1 | * | 3/2016 | Savkli | G06F 17/30277 707/722 |
| 2016/0071233 A1 | * | 3/2016 | Macko | G06T 11/206 345/440 |
| 2016/0275116 A1 | * | 9/2016 | Shi | G06F 8/75 |
| 2016/0335371 A1 | * | 11/2016 | Rao | G06F 17/30958 |
| 2016/0342709 A1 | * | 11/2016 | Fokoue-Nkoutche | G06F 17/30958 |

* cited by examiner

*Primary Examiner* — Cam-Linh Nguyen
(74) *Attorney, Agent, or Firm* — Mintz Levin Cohn Ferris Glovsky and Popeo, P.C.

(57) ABSTRACT

Based on received input, a vertex table of the database layer and a vertex key column in the vertex table can be identified. The vertex key column defines vertices of a graph representation. Also based on the received input, an edge table of the database layer, an edge key column in the edge table, a source column in the edge table, and a target column in the edge table can be identified. The source column and target column define relationships between vertices of the plurality of vertices. Within a graph workspace object, graph relationships linking the vertices defined by the vertex key column via edges defined by the source column and target column in the edge table can be assigned, and the graph workspace can be generated in a higher level programming layer based on the graph workspace object.

20 Claims, 6 Drawing Sheets

EXTENSIONS OF STRUCTURED QUERY LANGUAGE FOR DATABASE-NATIVE SUPPORT OF GRAPH DATA

TECHNICAL FIELD

The subject matter described herein relates to creation of objects defining graph-based interconnections in relational databases. Specifically, the extension of a relational database programming language to represent graph structures associated with relational databases.

BACKGROUND

Relational databases are used to store data that possess connections, or links, to other entries in the database. Relational databases typically make use of tabular data where rows correspond to different entities and columns describe properties for those entities. The structured query language (SQL) is implemented by many relational databases to allow a standard language with which a user can query or manipulate the tables in the relational database.

SUMMARY

In one aspect, a method includes instantiating a graph workspace object in a database architecture that includes a database layer, and identifying, based on received input, a vertex table of the database layer and a vertex key column in the vertex table. The vertex key column defines a plurality of vertices of a graph representation. The method further includes also identifying, based on the received input, an edge table of the database layer, an edge key column in the edge table, a source column in the edge table, and a target column in the edge table. The source column and target column define relationships between vertices of the plurality of vertices. Within the graph workspace object, graph relationships are assigned linking the vertices defined by the vertex key column via edges defined by the source column and target column in the edge table. A graph workspace is generated in a higher level programming layer based on the graph workspace object.

In some variations one or more of the following features can optionally be included in any feasible combination. A method can further include generating the vertex table and the edge table in a physical table pool. The vertex table can include a vertex row corresponding to each of the plurality of vertices, and the edge table can include an edge row that includes values in the edge key column, the source column, the target column, and an edge key column. The values in the source column and the target column can define a relationship linking two of the plurality of vertices, and the value in the edge key column can uniquely identify the relationship. The graph workspace can be created based on commands received in a native language configured to manipulate data in the database architecture. The native language can include a structured query language (SQL). The graph workspace object can be updated in response to changes in the vertex table or the edge table. The edge table and/or the vertex table can further include at least one property column identifying a property of elements present in the edge table and/or the vertex table. The higher level programming layer can include a calculation engine layer. The graph workspace can be instantiated in the calculation engine layer of the database architecture, and the edge table and vertex table can be maintained in a physical table pool of the database architecture.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to extensions of structured query language for database-native support of graph data, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The current subject matter provides, based on graph methods, a solution to the problem of expressing relationships between data contained in a relational database. Graph methods can be used to store, visualize, or otherwise represent relationships between elements in a database. In a graph, elements can be represent as vertices (or nodes) and connections between the vertices represented as edges. Graph methods provide a level of abstraction that can be used with powerful data characterization algorithms. Graphs can be used with algorithms or receive queries to determine, for example, the shortest or longest path between two vertices representing linked data, the number of connections between vertices, the degree of interconnectedness of a graph, and so on. The approach described herein does not prohibit creating secondary data structures, such as index structures, to accelerate graph methods. Such index structures can be treated as secondary, meaning that any changes in primary data (such as the graph structures or tables described herein) will override or invalidate the secondary data.

Relational databases can have this information explicitly included in the tables that make up the relational databases. For example, a table can have fields that indicate that two rows are related to each other. Other times though, the table may not have this explicit relationship and the relationships can be implied only through adjacency, similar field values, or other metrics. If a user wishes to establish or make explicit the relationship between elements in a relational database, it might require a solution outside the native language of the database. For example, the tables can be imported into a specialized graph database management system where relationships can be defined. Subsequently, this can result in a disconnect between the native database management commands, SQL for example, and whatever language the graph database management system is using. Furthermore, the use of non-native language for graph structures can result in non-current data in the graph system as well as increased synchronization overhead. As described in this application, a new approach for providing native support for graph-based representation of related database entries is provided.

Figure 1:
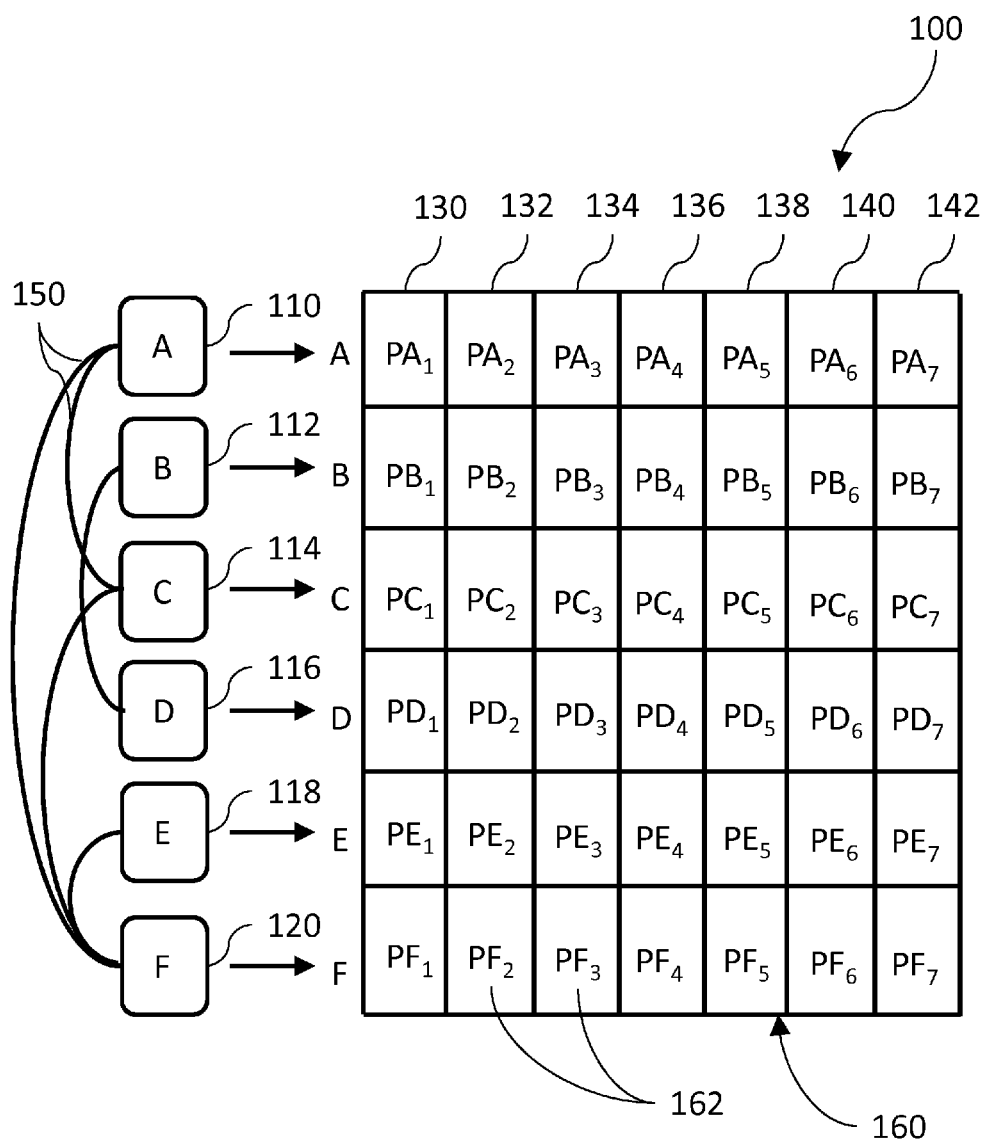
FIG. 1 shows a diagram illustrating a collection of linked elements expressed in a tabular format.

FIG. 1 is diagram 100 illustrating a collection of linked elements 110-120 expressed in a tabular format. Database tables can be used to store information about, for example, a particular object, person, record, etc. Here, an example is provided of six elements 110-120 labeled A-F that correspond to entries in a database table. Furthermore, it can be known that certain elements are related in some way to other elements. The relationships 150 are illustrated by the lines connecting the elements in FIG. 1. In this example, element A 110 is related to element C 114, element C 114 is related to element F 120, and so on. If the elements 110-120 referred to people then the relationships could indicate, for example, marriage, blood relationship, etc. If the elements 110-120 referred to, for example, financial entries, then the relationships could indicate that the financial entries were related to the same person or company.

As discussed above, elements can be stored in a relational database in a tabular format with each cell in a table 160 containing a table value 162. Each element 110-120 can correspond to a particular row in the table 160 as indicated by the arrows. Each element 110-120 can also have one or more properties associated with it. A property can be, for example where the element refers to a person, a first name, a middle name, a last name, a weight, etc. If the element were a financial entry, the properties could be, for example, amounts, payees or payers, dates, etc. As shown in the table 160, the properties 130-142 can be expressed as columns of data (also indicated by subscripts in the table values 162), with each column indicating only one property.

As described herein, each row in a table corresponds to a single element and each column corresponds to a single property. As used herein, a property refers to items of a same data type, for example, a name, address, amount, etc. This is not intended to be limiting, as a property, row, column, and so on, can, in some implementations, have more than one data type present. Accordingly, any table can be expressed in terms of elements that have properties, whether the property is expressed as a row or a column of the table.

Figure 2:
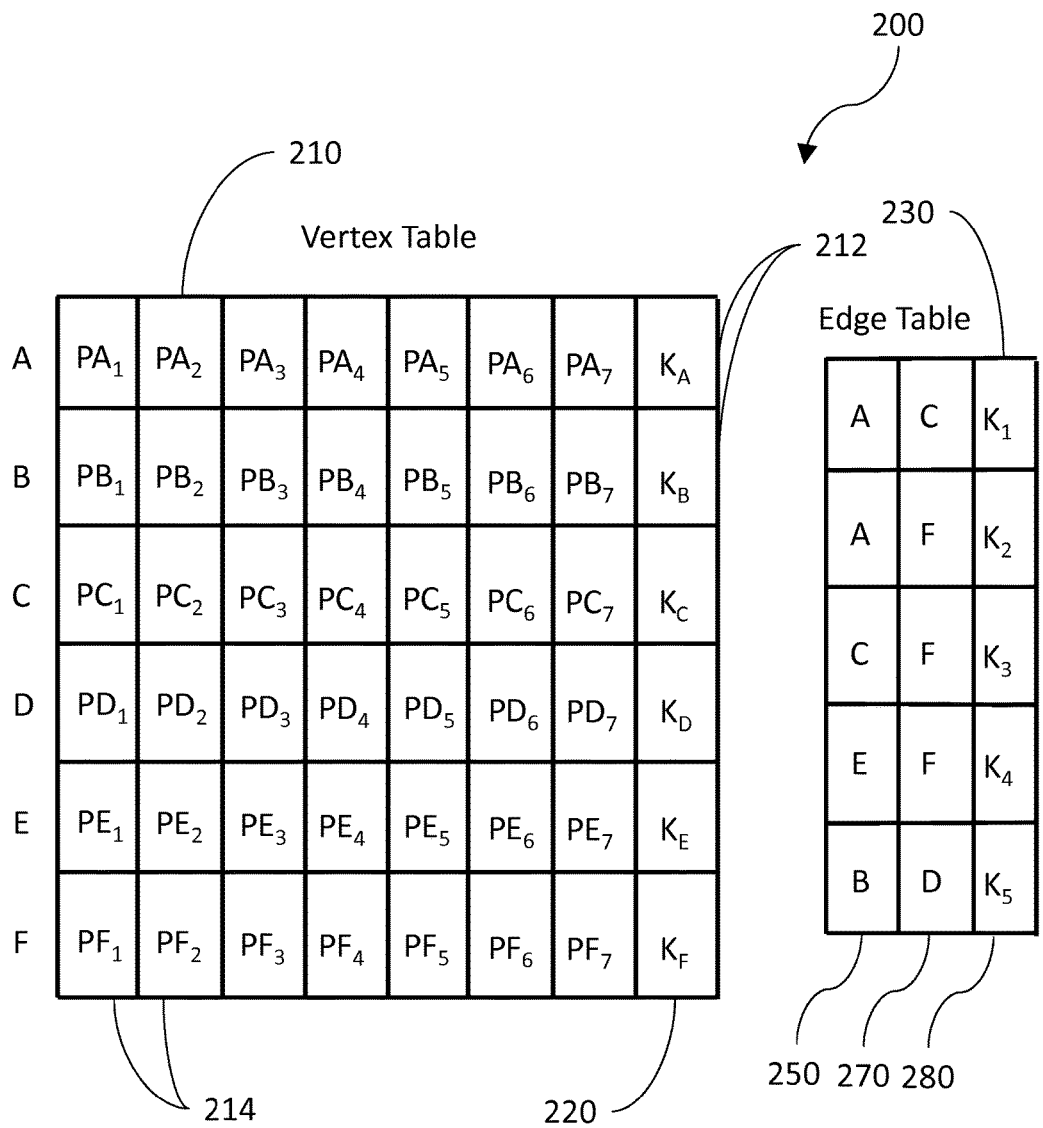
FIG. 2 shows a diagram illustrating a vertex table and an edge table.

FIG. 2 is a diagram 200 illustrating a vertex table 210 and an edge table 230. In the adaptation of tabular data to a graph-based expression, the information described in FIG. 1 can be expressed equivalently in two tables. In the vertex table 210, each element 110-120 can correspond to a row, herein referred to as a vertex row 212. Properties of the elements 110-120 can likewise be represented by columns in the vertex table 210, herein referred to as vertex columns 214, also indicated by the subscripts 1, 2, 3, etc.

The vertex table 210 can also include another column, referred to as a vertex key column 220. Entries in the vertex key column 220 can be similar to a primary key and can represent a unique identifier of the corresponding vertex row 212. The vertex key column 220 can be useful if vertex rows 212 are appended, inserted, deleted, and so on, through the course of database management and routine updating.

The second table shown in FIG. 2 is the edge table 230. The edge table 230, in the graph representation of the table in FIG. 1, can represent the relationships 150 between elements 110-120. The edge table 230 can contain a source column 250, a target column 270, and an edge key column 280. The source column 250 refers to one vertex in a graph and the target column 270 refers to the other vertex in a graph, with the source column 250 and target column 270 linked by an edge. In some implementations, the vertex table 210 and the edge table 230 can be combined in a single table.

The designation of the vertices as "source" and "target" do not imply nor enforce any sense of direction, ordering, hierarchy, or the like, between the source column 250 and the target column 270. A graph resulting from such non-directional representation of linked vertexes can be used to only indicate commonality or connection without implying any further order. In this way, the source column 250 and target column 270 can be transposed with no effect on the graph structure or its interpretation.

In one implementation, the designation of the vertices as "source" and "target" can describe a directed graph. In this implementation, the source column 250 and target column 270 can have specific roles as defined by the edge. For example, with financial payments, the source column 250 can refer to the payer and the target column 270 can refer to the payee. Such a directed graph is not equivalent under reversal of the source column 250 and target column 270. However, the constraints imposed by such a directed graph can be referenced by any algorithms seeking to utilize the graph structure.

In another implementation, the edge table 230 can represent a hybrid of directed and undirected edges. Such an implementation can be similar to the directed graph but with relaxed constraints given that some members of the graph can be reversed relative to an edge without corrupting the graph.

Figure 3:
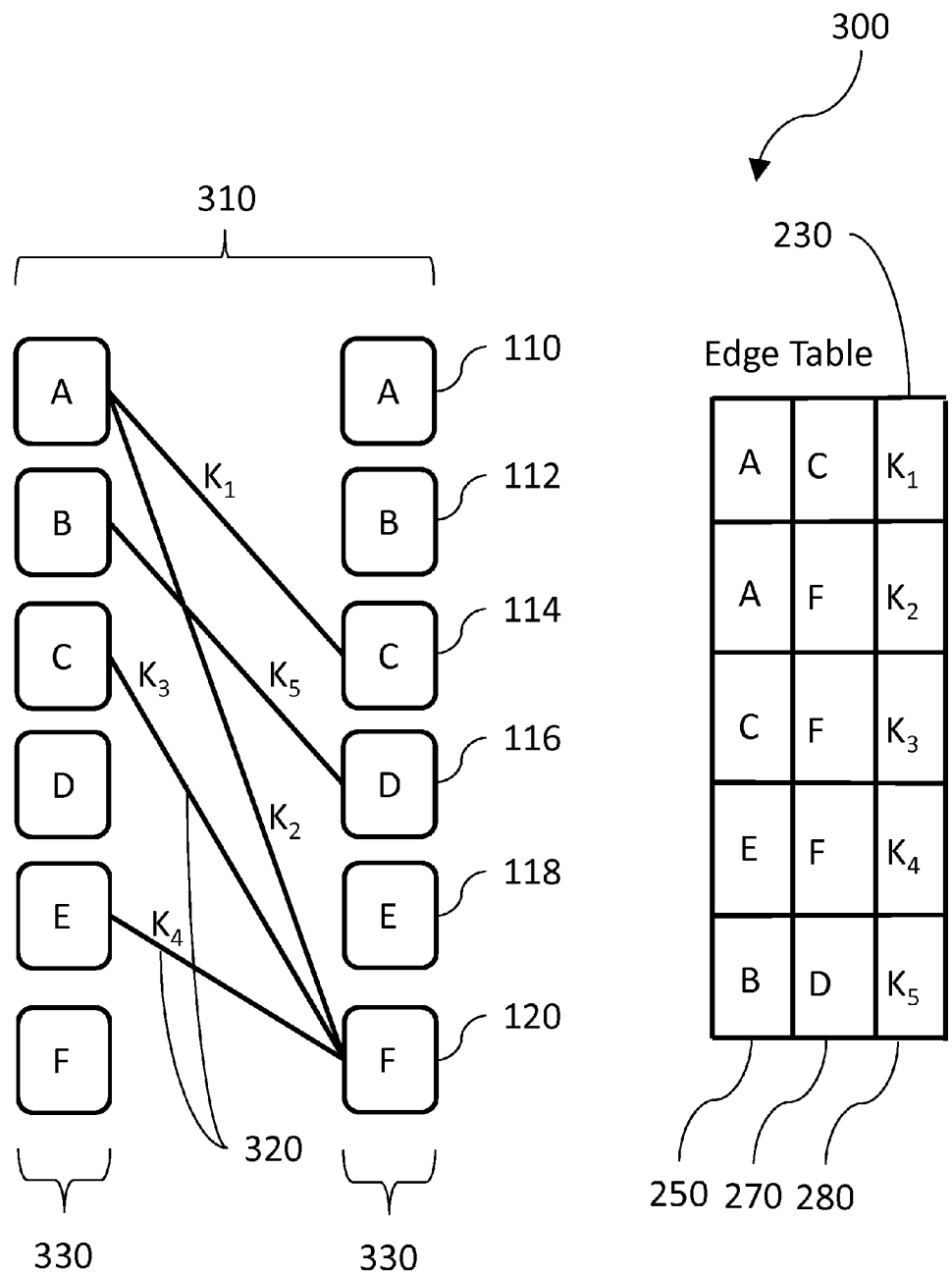
FIG. 3 shows a diagram illustrating a graph encapsulating the same information as the vertex table and the edge table.

FIG. 3 is a diagram 300 illustrating a graph 310 encapsulating the same information as the vertex table 210 and the edge table 230. The graph 310 shown is a realization of the related elements illustrated in FIG. 1, but now enabled by the creation of the edge table 230 and vertex table 210. This realization can be described by vertices 330 (corresponding to elements 110-120 in FIG. 1) connected by edges 320 (corresponding to the relationships 150 in FIG. 1). For clarity in FIG. 3, no inverse relationships are shown. For example, while the edge between vertex A on the left and vertex C on the right is shown, there is an implied link between vertex C on the right and vertex A on the left. Though, if the edge between vertex A and vertex C was a directed edge, then no such inverse relationship would exist. As can be seen from FIG. 3, the integrity of the graph 310 is maintained even if properties in the graph 310 change because the edge table 310 only refers to the vertices 110-120 of the graph 310, not the properties.

In some implementations, a visualization of the graph 310 can be displayed on a graphical user interface. The visualization can correspond to two or more vertex rows 212 from the vertex table 210 related as defined by the edge table 230. One example of a representation can be the graph 310 shown in FIG. 3. Other methods of representation of the graph 310 are possible, for example providing a text file, a collection of pointer objects, an array of paired sets, etc.

With the vertex table 210 and the source column 250 table defined, and the features of the graph representation of a relational database explained, one implementation for utilizing the vertex table 210 and the edge table 230 in SQL can be described. In many applications, tables are already provided in a database, as well as the data that defines the relationships between entities, or rows, in the various tables. The existing tables can provide the vertices in the vertex tables 210 and the edges for the edge table 230. To see how the concept of the vertex table 210 and the edge table 230 can be implemented in SQL, we will present a code example that describes exemplary SQL commands that can generate the tables. Next, we will introduce the implementation of a graph workspace object that can reference the vertex tables 210 and edge table 230. Then, we will present an example that applies table and graph workspace object creation to a specific application.

If it does not already exist, a table can be created with SQL that conforms to a specified schema. As used with databases, the schema can define a table structure or namespace that includes one or more sub-tables. One example of creating a schema in SQL can be shown by the following code fragment:

```
CREATE SCHEMA <SCHEMA NAME>;
  CREATE COLUMN TABLE <SCHEMA NAME> . <TABLE NAME>
(
    <PROPERTY NAME> <VARIABLE TYPE>);
  CREATE COLUMN TABLE <SCHEMA NAME> . <TABLE NAME>
(
    "<PROPERTY NAME> <VARIABLE TYPE>);
```

Here, the first column table can represent the vertex table 210 and the second column table can represent the edge table 230. While only one property is shown as created in each table, there can be an arbitrary number of properties created for each table. In some implementations, the creation of the tables can also include specification of the variable type and size used to define their various properties. Other schemas can be implemented for creating the tables but if a schema is omitted then a default schema can be used.

In one implementation, an object, referred herein as a graph workspace object, can be created or instantiated. The graph workspace object can be a catalog object that defines, or provides a view of, a graph 310 in terms of a vertex table 210 and an edge table 230. One example of an SQL statement to create the graph workspace object can be:

```
CREATE GRAPH WORKSPACE [<schema>.]<name>
    VERTEX TABLE <table_name>
        KEY COLUMN <column_name_list>
    EDGE TABLE <table_name>
        SOURCE COLUMN <column_name_list>
        TARGET COLUMN <column_name_list>
        KEY COLUMN <column_name_list>
```

While the structure for creating the graph workspace object is similar to creating the schema, they are in fact distinct data structures; the schema can be a table structure and the graph workspace object can be an object that references the tables in the schema. The graph workspace object can contain references to the vertex table 210 and the edge table 230. The user, when defining the graph workspace object can provide input to identify the various tables and columns referenced therein. Specifically, input can be provided that identifies the vertex table 210 and the vertex key column 220. To create a graph workspace object there can be a minimum number of properties (or columns) required in a given table. For example, the vertex table 210 need only require one property, in this case a vertex key column 220, which uniquely defines a vertex 330 (such as a row in an RDB table). Similarly, to define an edge 320, there can be input that identifies the edge table 230, a source column 250, a target column 270, and an edge key column 280. The source column 250 and target column 270 reference vertices 330 that are related. In this way, the source column 250 and target column 270 define the relationships between vertices 330 in the graph. The edge key column 280 can reference a unique identifier that uniquely identifies the edges 320 defined by the source column 250 and the target column 270. Taken together, graph relationships can be assigned within the graph workspace object that link the vertices 330 defined by the vertex key column 220 via the edges 320 defined by the source column 250 and the target column 270 in the edge table 230.

The graph workspace can be created by commands received in, for example, a native language configured to manipulate data in a relational database. Specifically, as described above, the native language can be SQL. Accordingly, the graph workspace object can be updated in response to changes in the vertex table 210 or the edge table 230.

One specific exemplary application for creating a schema in SQL relating to a collection of family members can be:

```
CREATE SCHEMA "FAMILY";
  CREATE COLUMN TABLE "FAMILY"."MEMBERS" (
    "IDnumber" VARCHAR(1024) PRIMARY KEY,
    "firstname" VARCHAR(1024),
    "middlename" VARCHAR(1024),
    "lastname" VARCHAR(1024),
    "birthdate" DATE,
    "height" INTEGER,
    "weight" DOUBLE);
  CREATE COLUMN TABLE "FAMILY"."MEMBERS" (
    "UID" INTEGER PRIMARY KEY,
    "source" NOT NULL REFERENCES "FAMILY.MEMBERS",
    "target" NOT NULL REFERENCES "FAMILY.MEMBERS",
    "type" VARCHAR(1024),
    "confidence" REAL);
```

Here, the property named "IDnumber" is acting as a unique and static identifier, which can also be referred to as a primary key, for the row that corresponds to a particular family member. Other properties relevant to the entry for each person can also be defined as shown. The second table corresponds to the edge table 230. Here, the edge key column is named UID and serves as the primary key for the edge table 230. The source column is named "source" and the edge column is named "edge." Each of these columns can have entries that reference "IDnumber" for various rows in the first column table that has the information on family members. In this way, all the information needed for define an edge connecting two family members is present. Once the first table (vertex table 210) and the second table (the edge table 230) are created, then a graph workspace object GENEALOGY in schema FAMILY can be created:

```
CREATE GRAPH WORKSPACE FAMILY.GENEALOGY
    VERTEX TABLE FAMILY.MEMBERS
        KEY COLUMN "IDnumber"
    EDGE TABLE FAMILY.RELATIONSHIPS
        SOURCE COLUMN "source"
        TARGET COLUMN "target"
        KEY COLUMN "UID"
```

Here, the graph workspace object identifies the vertex table 210 as the "FAMILY.MEMBERS" table. Also, the key column to be used for the vertex table 210 can be identified as the "IDnumber" column. Similarly, the edge table 230 identifies the "FAMILY.RELATIONSHIPS" table. The source column and the target column reference the "source" and "target," respectively, which were defined in the edge table 230. Similarly, the key column to be used for the vertex table 210 can be identified as the "UID" column.

The graph workspace object can support other functionality, for example a delete operation can be performed by the SQL statement:
DROP GRAPH WORKSPACE <workspace_name>;
Also, all existing graph workspaces objects can be stored in a catalog along with other catalog objects, for example, schemas, tables, views, sequences, stored procedures, etc. The catalog can provide a list of all catalog objects currently defined in the catalog.

A graph workspace object is consistent if 1) both keys (the vertex key column 220 and the edge key column 280) contain unique and not contain NULL values and 2) the source column 250 and target column 270 contain values that exist in the vertex table 210. In the CREATE statement the column constraints (SOURCE "source" and TARGET "target") can be used to guarantee the consistency of the graph workspace object. Any other column constraints, or multiple column constraints, can be used to further guarantee graph workspace object consistency.

Figure 4:
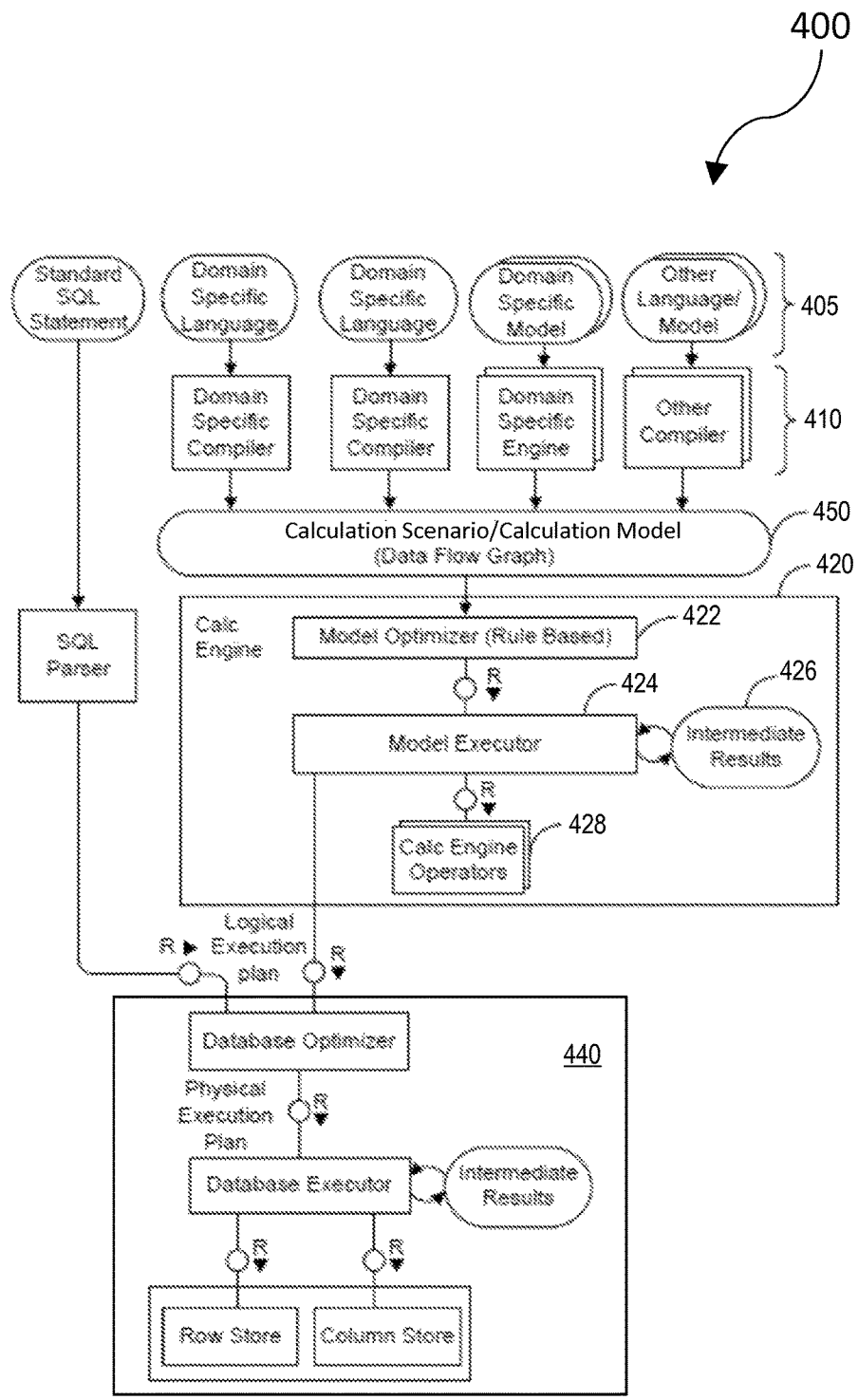
FIG. 4 shows an example of a system including a calculation engine.

FIG. 4 is a diagram 400 illustrating a sample system for request processing and execution control. As shown in FIG. 4, artifacts 405 in different domain specific languages can be translated by their specific compilers 410 into a common representation called a "calculation scenario" 450 (which is also referred to in in FIG. 5 as a calculation model). To achieve enhanced performance, the models and programs written in these languages are executed inside the database server 440. This arrangement eliminates the need to transfer large amounts of data between the database server 440 and a client application 437, which can be executed by an application server 435. Once the different artifacts 405 are compiled into this calculation scenario 450, they can be processed and executed in the same manner. A calculation engine 420 executes the calculation scenarios 450.

A calculation scenario 450 can be a directed acyclic graph with arrows representing data flows and nodes that represent operations. Each node includes a set of inputs and outputs and an operation (or optionally multiple operations) that transforms the inputs into the outputs. In addition to their primary operation, each node can also include a filter condition for filtering the result set. The inputs and the outputs of the operations can be table-valued parameters (i.e., user-defined table types that are passed into a procedure or function and that provide an efficient way to pass multiple rows of data to a client application 437 at the application server 435). Inputs can be connected to tables or to the outputs of other nodes. A calculation scenario 450 can support a variety of node types such as (i) nodes for set operations such as projection, aggregation, join, union, minus, intersection, and/or other operations as well as (ii) SQL nodes that execute a SQL statement that is an attribute of the node. In addition, to enable parallel execution, a calculation scenario 450 can contain split and merge operations. A split operation can be used to partition input tables for subsequent processing steps based on partitioning criteria. Operations between the split and merge operation can then be executed in parallel for the different partitions. Parallel execution can also be performed without split and merge operation such that all nodes on one level can be executed in parallel until the next synchronization point. Split and merge allows for enhanced/automatically generated parallelization. If a user knows that the operations between the split and merge can work on portioned data without changing the result, he or she can use a split. Then, the nodes can be automatically multiplied between split and merge and partition the data.

A calculation scenario 450 can be defined as part of database metadata and invoked multiple times. A calculation scenario 450 can be created, for example, by a SQL statement "CREATE CALCULATION SCENARIO<NAME>USING<XML or JSON>". Once a calculation scenario 450 is created, it can be queried (e.g., "SELECT A, B, C FROM <scenario name>", etc.). In some cases, databases can have pre-defined calculation scenarios 450 (default, previously defined by users, etc.). Calculation scenarios 450 can be persisted in a repository (coupled to the database server 440) or in transient scenarios. Calculation scenarios 450 can also be kept in-memory.

Calculation scenarios 450 are more powerful than traditional SQL queries or SQL views for many reasons. One reason is the possibility to define parameterized calculation schemas that are specialized when the actual query is issued. Unlike a SQL view, a calculation scenario 250 does not describe the actual query to be executed. Rather, it describes the structure of the calculation. Further information is supplied when the calculation scenario is executed. This further information can include parameters that represent values (for example in filter conditions). To provide additional flexibility, the operations can optionally also be refined upon invoking the calculation model. For example, at definition time, the calculation scenario 450 may contain an aggregation node containing all attributes. Later, the attributes for grouping can be supplied with the query. This allows having a predefined generic aggregation, with the actual aggregation dimensions supplied at invocation time. The calculation engine 420 can use the actual parameters, attribute list, grouping attributes, and the like supplied with the invocation to instantiate a query specific calculation scenario 450. This instantiated calculation scenario 450 is optimized for the actual query and does not contain attributes, nodes or data flows that are not needed for the specific invocation.

When the calculation engine 420 gets a request to execute a calculation scenario 250, it can first optimize the calculation scenario 450 using a rule based model optimizer 422. Examples for optimizations performed by the model optimizer can include "pushing down" filters and projections so that intermediate results 426 are narrowed down earlier, or the combination of multiple aggregation and join operations into one node. The optimized model can then be executed by a calculation engine model executor 424 (a similar or the same model executor can be used by the database directly in some cases). This includes decisions about parallel execution of operations in the calculation scenario 450. The model executor 424 can invoke the required operators (using, for example, a calculation engine operator's module 428) and manage intermediate results. Most of the operators are executed directly in the calculation engine 420 (e.g., creating the union of several intermediate results). The remaining nodes of the calculation scenario 450 (not implemented in the calculation engine 420) can be transformed by the model executor 424 into a set of logical database execution plans. Multiple set operation nodes can be combined into one logical database execution plan if possible.

Figure 5:
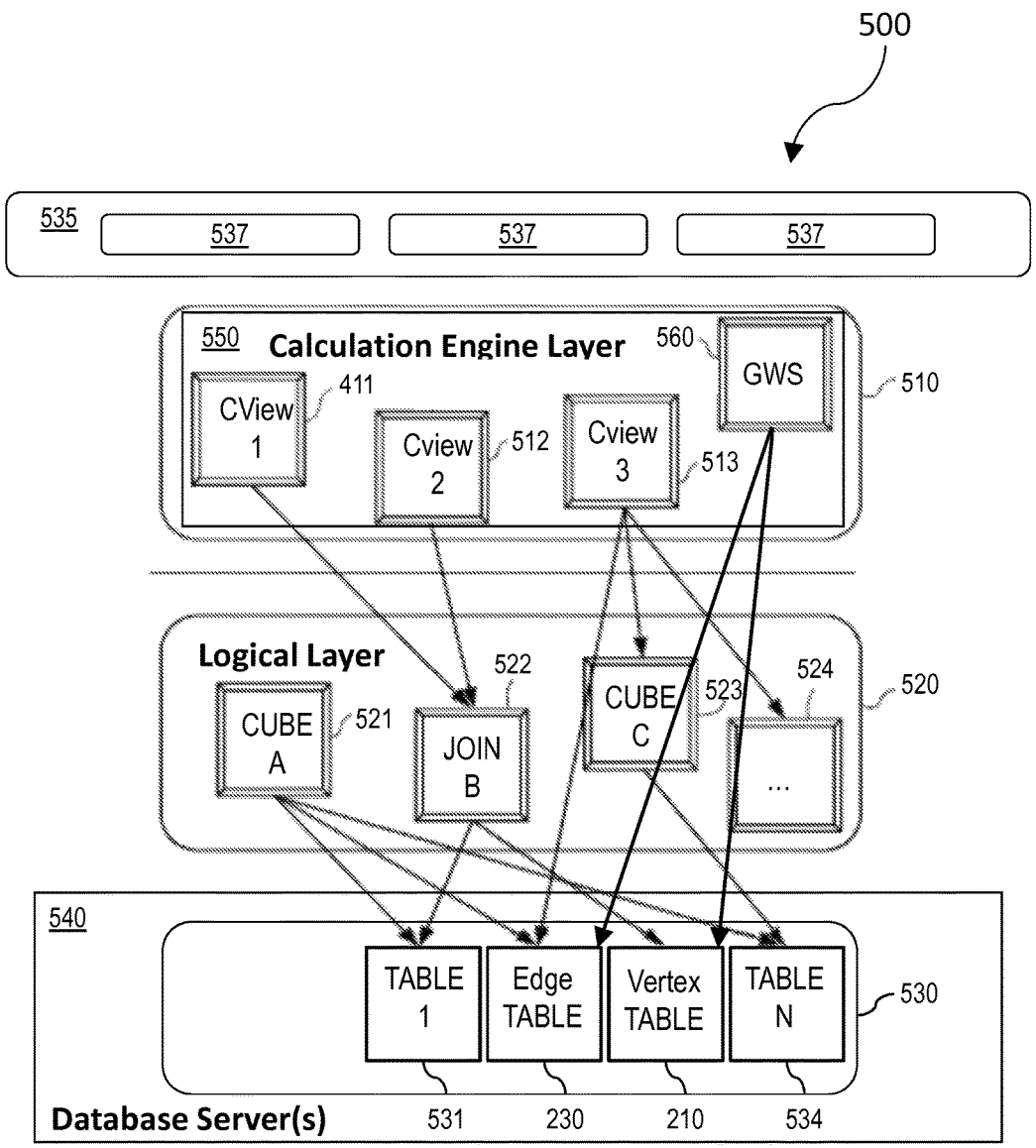
FIG. 5 shows an example of a system including a graph workspace in a calculation engine providing request processing and execution control.

FIG. 5 is a diagram that illustrates a computing architecture 510 including a database system that can include three layers: a calculation engine layer 510, a logical layer 520, and a physical table-pool 530. The edge table 230 and vertex table 210 can be in the physical table pool 530 of the computer architecture. The layers above the physical table pool, for example the logical layer 520 and the calculation engine layer 510, can be grouped into what can be referred to as a higher level programming layer. A graph workspace can be generated, based on the graph workspace object, in any layer of the higher level programming layer. In one implementation, the graph workspace can be instantiated in the calculation engine layer of the computing architecture. The graph workspace can integrate the graph workspace object with any visualizations or function calls provided by the user or a connected computing system.

One or more application servers 535 implementing database client applications 537 can access a database system 500.

Calculation scenarios can be executed by a calculation engine, which can form part of a database or which can be part of the calculation engine layer 510 (which is associated with the database). The calculation engine layer 510 can be based on and/or interact with the other two layers, the logical layer 520 and the physical table pool 530. The basis of the physical table pool 530 consists of one or more physical tables (also called indexes or database tables) containing the data, which can be stored on one more database servers 540. Various tables 531-534 can be joined using logical models (also called metamodels) 521-524 defined by the logical layer 520 to form an index. For example, the tables 531-534 in a cube (e.g. an online analytical processing or "OLAP" index) can be assigned roles (e.g., fact or dimension tables) and joined to form a star schema. It is also possible to form join indexes (e.g., join index B 522 in FIG. 5 or a UNION at 524), which can act like database views in computing environments such as the Fast Search Infrastructure (FSI) available from SAP SE of Walldorf, Germany.

As stated above, a calculation scenario can include individual nodes (e.g. calculation nodes) 511-514, which in turn each define operations such as joining various physical or logical indexes and other calculation nodes (e.g., CView 4 is a join of CView 2 and CView 3).

In a calculation scenario, two different representations can be provided, including a) a pure calculation scenario in which all possible attributes are given and b) an instantiated model that contains only the attributes requested in the query (and required for further calculations). Thus, calculation scenarios can be created that can be used for various queries.

With such an arrangement, a calculation scenario 550 can be created which can be reused by multiple queries even if such queries do not require every attribute specified by the calculation scenario 550. As noted above, this reuse may cause an increased size in the set of attributes and the corresponding calculation scenario, which makes parsing, persisting, and/or optimizing of the calculation scenarios more processor, memory, and/or power intensive.

Every calculation scenario 550 can be uniquely identifiable by a name (e.g., the calculation scenario 550 can be a database object with a unique identifier, etc.). Accordingly, the calculation scenario 550 can be queried in a manner similar to a view in a SQL database. Thus, the query is forwarded to the calculation node 511-514 for the calculation scenario 550 that is marked as the corresponding default node. In addition, a query can be executed on a particular calculation node 511-514 (as specified in the query). Furthermore, nested calculation scenarios can be generated in which one calculation scenario 550 is used as source in another calculation scenario (e.g. via a calculation node 511-514 in this calculation scenario 550). Each calculation node 511-514 can have one or more output tables. One output table can be consumed by several calculation nodes 511-514.

Figure 6:
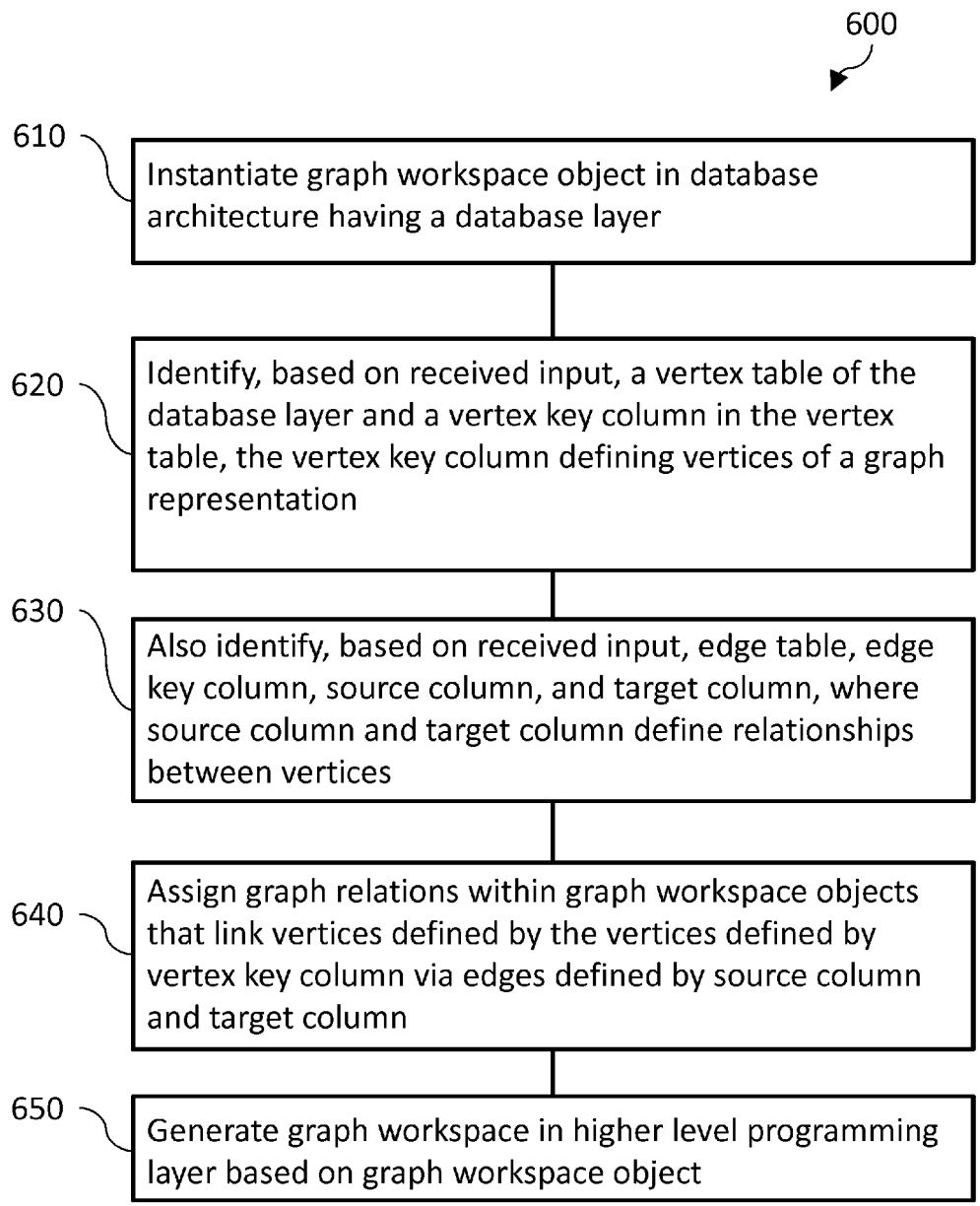
FIG. 6 shows a process flow diagram illustrating creation of a graph workspace.

FIG. 6 is a process flow diagram 600 illustrating creation of a graph workspace.

At 610, a graph workspace object 550 can be instantiated in a database architecture comprising a database layer 540.

At 620, based on received input, a vertex table 210 of the database layer 540 and a vertex key column 220 in the vertex table 210 can be identified. The vertex key column 220 can define a plurality of vertices 330 of a graph representation 310.

At 630, based on the received input, an edge table 230 of the database layer 540, an edge key column 280 in the edge table 230, a source column in the edge table 230, and a target column in the edge table 230 can be identified. The source column 250 and target column 270 can define relationships between two vertices 310.

At 640, graph relationships can be assigned within the graph workspace object 560 linking the vertices 310 defined by the vertex key column 280 via edges 320 defined by the source column 250 and target column 270 in the edge table 230.

At 650, a graph workspace can be generated in a higher level programming layer based on the graph workspace object.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive trackpads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A computer program product comprising a non-transient machine-readable medium storing instructions that, when executed by at least one programmable processor, cause the at least one programmable processor to perform operations comprising:

receiving an input, the input being in a native language configured to manipulate data in a database;

generating, based at least on the input, a graph workspace object in a database layer comprising the database, the graph workspace object providing a database view of a graph by at least referencing a vertex table and an edge table identified by the input, the vertex table and/or the edge table comprising one or more tables in a physical table pool of the database, the vertex table including a vertex key column defining a plurality of vertices comprising the graph, the edge table including an edge key column, a source column, and a target column defining one or more edges comprising the graph, the one or more edges corresponding to relationships between the plurality of vertices; and generating, based at least on the graph workspace object, a graph workspace in a higher level programming layer of the database, the graph workspace providing a database view of the graph.

2. The computer program product of claim 1, wherein the operations further comprise:

generating the vertex table in the physical table pool, the vertex table comprising a vertex row corresponding to each of the plurality of vertices; and generating the edge table in the physical table pool, the edge table comprising an edge row corresponding to each of the one or more edges, each edge row comprising values in the edge key column, the source column, and the target column, the values in the source column and the target column linking two of the plurality of vertices, and the values in the edge key column uniquely identifying the plurality of edges.

3. The computer program product of claim 1, wherein the input comprises one or more commands in the native language.

4. The computer program product of claim 1, wherein the native language comprises a structured query language (SQL).

5. The computer program product of claim 1, wherein the operations further comprise updating the graph workspace object in response to a change in the vertex table and/or the edge table.

6. The computer program product of claim 1, wherein the edge table and/or the vertex table further comprise at least one property column identifying a property of elements present in the edge table and/or the vertex table.

7. The computer program product of claim 1, wherein the higher level programming layer comprises a calculation engine layer.

8. The computer program product of claim 7, wherein the operations further comprise instantiating the graph workspace in the calculation engine layer of the database.

9. A method for implementation by one or more data processors forming part of at least one computing system, the method comprising:
receiving an input, the input being in a native language configured to manipulate data in a database;
generating, based at least on the input, a graph workspace object in a database layer comprising the database, the graph workspace object providing a database view of a graph by at least referencing a vertex table and an edge table identified by the input, the vertex table and/or the edge table comprising one or more tables in a physical table pool of the database, the vertex table including a vertex key column defining a plurality of vertices comprising the graph, the edge table including an edge key column, a source column, and a target column defining one or more edges comprising the graph, the one or more edges corresponding to relationships between the plurality of vertices;
and
generating, based at least on the graph workspace object, a graph workspace in a higher level programming layer of the database, the graph workspace providing a database view of the graph.

10. The method of claim 9, wherein the operations further comprise:
generating the vertex table in the physical table pool, the vertex table comprising a vertex row corresponding to each of the plurality of vertices; and
generating the edge table in the physical table pool, the edge table comprising an edge row corresponding to each of the one or more edges, each edge row comprising values in the edge key column, the source column, and the target column, the values in the source column and the target column linking two of the plurality of vertices, and the values in the edge key column uniquely identifying the plurality of edges.

11. The method of claim 9, wherein the input comprises one or more commands in the native language.

12. The method of claim 9, wherein the native language comprises a structured query language (SQL).

13. The method of claim 9, wherein the operations further comprise updating the graph workspace object in response to a change in the vertex table and/or the edge table.

14. The method of claim 9, wherein the edge table and/or the vertex table further comprise at least one property column identifying a property of elements present in the edge table and/or the vertex table.

15. The method of claim 9, wherein the higher level programming layer comprises a calculation engine layer.

16. The method of claim 15, wherein the operations further comprise instantiating the graph workspace in the calculation engine layer of the database.

17. A system, comprising:
at least one programmable processor; and
at least one memory storing instructions, which when executed by the at least one programmable processor, cause operations comprising:
receiving an input, the input being in a native language configured to manipulate data in a database;
generating, based at least on the input, a graph workspace object in a database layer comprising the database, the graph workspace object providing a database view of a graph by at least referencing a vertex table and an edge table identified by the input, the vertex table and/or the edge table comprising one or more tables in a physical table pool of the database, the vertex table including a vertex key column defining a plurality of vertices comprising the graph, the edge table including an edge key column, a source column, and a target column defining one or more edges comprising the graph, the one or more edges corresponding to relationships between vertices the plurality of vertices;
and
generating, based at least on the graph workspace object, a graph workspace in a higher level programming layer of the database, the graph workspace providing a database view of the graph.

18. The system of claim 17, wherein the operations further comprise:
generating the vertex table in the physical table pool, the vertex table comprising a vertex row corresponding to each of the plurality of vertices; and
generating the edge table in the physical table pool, the edge table comprising an edge row corresponding to each of the one or more edges, each edge row comprising values in the edge key column, the source column, and the target column, the values in the source column and the target column linking two of the plurality of vertices, and the values in the edge key column uniquely identifying the plurality of edges.

19. The system of claim 17, wherein the operations further comprise updating the graph workspace object in response to a change in the vertex table and/or the edge table.

20. The system of claim 17, wherein the higher level programming layer comprises a calculation engine layer, and wherein the graph workspace is instantiated in the calculation engine layer of the database.

* * * * *